(12) United States Patent
Ernst

(10) Patent No.: US 6,457,780 B1
(45) Date of Patent: Oct. 1, 2002

(54) WHEEL SHIELD

(76) Inventor: Gregory R. Ernst, 15735 SE. Bartell Rd., Boring, OR (US) 97009

( * ) Notice: Subject to any disclaimer, the term of this patent is extended or adjusted under 35 U.S.C. 154(b) by 0 days.

(21) Appl. No.: 09/918,422

(22) Filed: Jul. 30, 2001

(51) Int. Cl.[7] .................................................. B60B 7/00
(52) U.S. Cl. .............................. 301/37.103; 301/37.104
(58) Field of Search ...................... 301/37.101, 37.103, 301/37.104

(56) References Cited

U.S. PATENT DOCUMENTS

| | | | | |
|---|---|---|---|---|
| 2,835,222 A | * | 5/1958 | Hall .......................... | 118/301 |
| 4,628,858 A | * | 12/1986 | King et al. ............ | 301/37.104 |
| 4,784,440 A | * | 11/1988 | Fair ....................... | 301/37.103 |
| 4,792,191 A | * | 12/1988 | Farmer .................. | 301/37.102 |
| 4,811,991 A | * | 3/1989 | Moreno et al. ........ | 301/37.103 |
| 4,874,206 A | * | 10/1989 | Sampson ............... | 301/37.103 |
| 5,423,599 A | * | 6/1995 | Sherod et al. ......... | 301/37.103 |
| 5,435,630 A | * | 7/1995 | Tucker .................. | 301/37.103 |
| 5,524,972 A | * | 6/1996 | Cailor et al. .......... | 301/37.103 |
| 6,068,345 A | * | 5/2000 | Bressie ................. | 301/37.103 |
| 6,179,387 B1 | * | 1/2001 | Nasset et al. .......... | 301/37.103 |

* cited by examiner

*Primary Examiner*—S. Joseph Morano
*Assistant Examiner*—Jason R. Bellinger
(74) *Attorney, Agent, or Firm*—James D. Givnan, Jr.

(57) ABSTRACT

A shield is of concavo-convex molded construction and overlies at least part of an automobile wheel to protect the wheel during washing of a tire sidewall. Shield wall thickness tapers in a radial direction to provide a flexible marginal area capable of permitting the rim of the shield to be manually displaced to enable shield use with wheels of different diameters. A hand grip is provided by elongate openings in the shield.

2 Claims, 1 Drawing Sheet

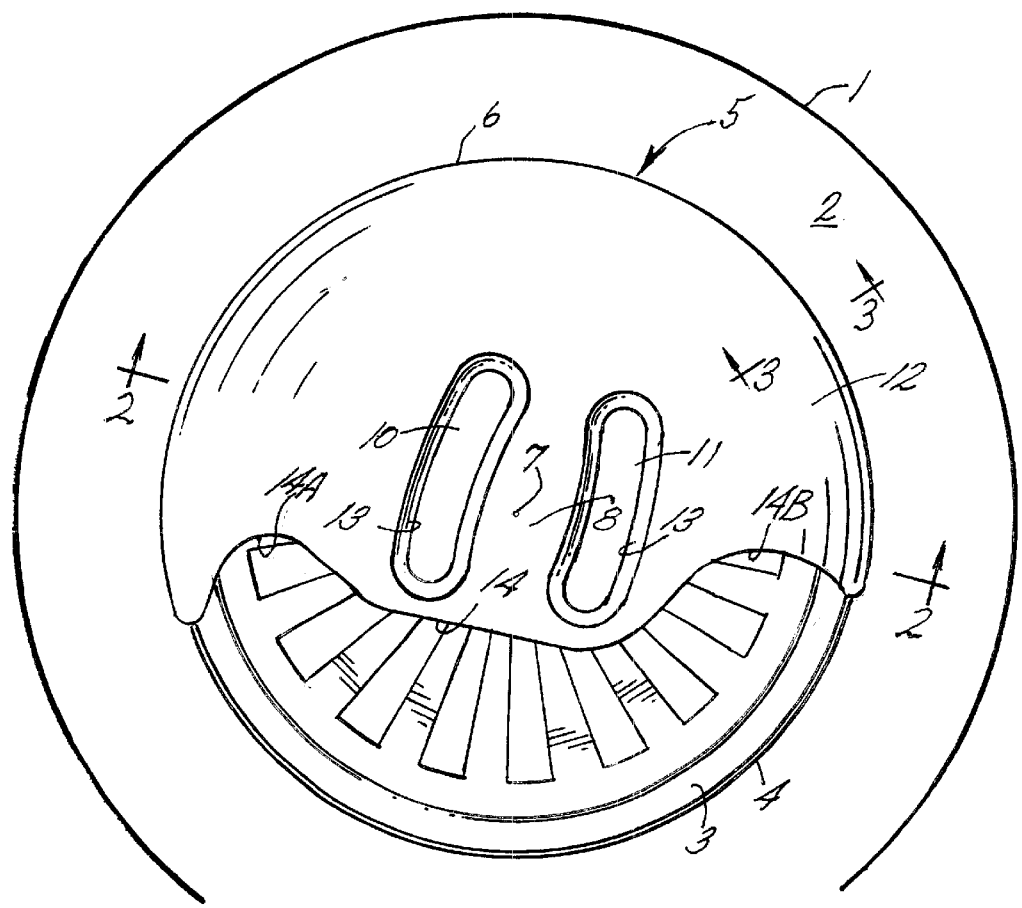
_Fig 1_
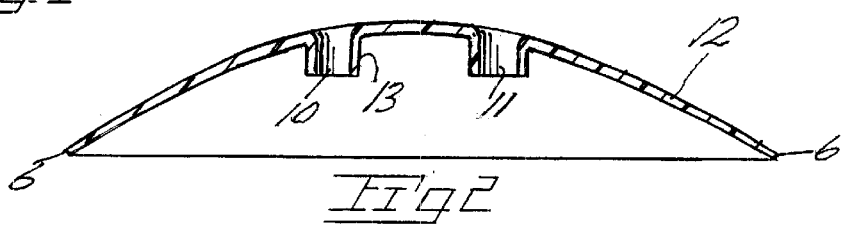
_Fig 2_
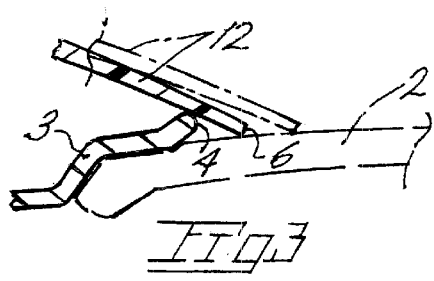
_Fig 3_

WHEEL SHIELD

BACKGROUND OF THE INVENTION

The present invention pertains generally to protective devices for contact with an automotive wheel to shield a portion of the wheel assembly against deposits dislodged during cleaning.

Available presently are a wide range of cleaning products sold to facilitate the cleaning of a wheel assembly during washing of an automobile. Presently it is in vogue to enhance automobile appearance by installation of wheels having a highly attractive appearance such as being chrome plated or otherwise attractively finished. The use of certain chemicals or abrasive products to clean tire sidewalls may damage the bright finish of an automobile wheel. Also dislodged dirt or grit may harm wheel surface. Accordingly, when using a tire sidewall cleaner, it is highly desirable to shield the metal wheel from the cleaning medium to avoid degrading wheel appearance. As certain makes of automobile wheels sold in sets may cost in excess of hundreds of dollars, it is highly desirable that such wheels be protected from damage during washing of an automobile.

In the prior art, U.S. Pat. No. 2,835,222 shows a tire sidewall protector for use when cleaning an automobile wheel. Two semi-circular members are adjustable to effect engagement with a wheel rim.

U.S. Pat. No. 4,628,858 discloses a sidewall mask of semi-circular shape provided with a handle for urging the mask into sidewall abutment.

U.S. Pat. No. 4,784,440 discloses a cone shaped wheel protector having a rim for seatied engagement with the wheel perimeter at points thereabout.

U.S. Pat. No. 4,792,191 discloses a cone shaped protector having an open segment to permit the diameter of the protector to be altered to accommodate different wheel diameters. The outer margin of the protector is provided with interengageable slots and tabs to maintain the protector in a desired diameter.

U.S. Pat. No. 4,811,991 discloses a truncaded cone for placement over an automobile wheel during the application of a cleaner to tire sidewalls.

U.S. Pat. No. 4,874,206 discloses a circular disk shaped guard for engagement with the rim of an automobile wheel with a series of removable annular spaces permitting sizing of the device to a specific wheel diameter.

U.S. Pat. No. 5,423,599 discloses a conical guard for placement over an automobile wheel with edge contact with the tire about the wheel rim. The guard is of plastic construction in one form to permit some degree of flexure during attachment to a wheel.

U.S. Pat. No. 5,435,630 depicts a circular protector having a perimeter shaped to effect engagement with a wheel rim.

SUMMARY OF THE PRESENT INVENTION

The present invention is embodied within a flexible shield for covering at least a portion of an automobile wheel during cleaning of the tire on the wheel.

The shield is of concavo-convex shape having an arcuate perimeter which may be flexed to enable use of the present shield with automotive wheels of different diameter. The perimetrical edge of the shield is engageable with a tire sidewall adjacent the outer edge of an automobile wheel to provide a barrier to prevent the flow of dirty water, cleaning medium and dislodged debris from direct contact with an automobile wheel. Wheels having a decorative finish are susceptible to degradation by the above matter. The outer margin of the present shield is highly flexible for displacement outwardly upon manual pressure being imparted to the shield during use. For example, the present shield may accommodate wheels of different diameters upon such flexing of the shield. A hand grip is provided in the form of elongate openings in the shield to permit secure grasping of same. An irregular free edge of the shield contributes to shield flexibility.

Important objectives of the present wheel shield include the provision of a molded, flexible wheel shield having an outer marginal area which is of reduced section and flexes to the extent of enabling contact with tire sidewalls on at least two different wheel radii; the provision of a wheel shield for use during washing of an automobile wheel assembly wherein the shield is arcuately repositioned during use to shield the wheel from cleaning solutions and dislodged debris to protect the wheel finish; the provision of a wheel shield defining a pair of openings disposed so as to constitute a handgrip facilitating shield placement and the imparting of an axially directed force to the shield for optimum contact with a tire sidewall.

BRIEF DESCRIPTION OF THE DRAWINGS

In the accompanying drawings:

FIG. 1 is a elevational view of the present wheel operatively disposed against a tire sidewall;

FIG. 2 is a sectional view taken along line 2—2 of FIG. 1; and

FIG. 3 is a sectional view taken along line 3—3 of FIG. 1 with a tire sidewall shown in flexed dashed lines.

DETAILED DESCRIPTION OF THE PREFERRED EMBODIMENTS

With continuing attention to the drawings, the reference numeral 1 indicates an automotive tire having a sidewall 2 with the tire mounted in place on an automotive wheel 3. The wheel rim is indicated at 4.

The present wheel shield is indicated generally at 5 and is of concavo-convex, gemerally semi-circular, shape having a perimeter at 6 hereinafter frequently referred to as a rim, extending at least in a semi-circular manner about the shield center at 7. The shield is of molded construction having a hand grip at 8 preferably formed by elongate openings 10 and 11 each defined by a continuous flange as at 12 and 13. The openings 10 and 11 are of a size to admit the fingers within one opening and the thumb of the hand within the remaining opening to enable firm grasping of the shield.

A radially extending marginal area at 12 is preferably of tapered cross-section, i.e., diminishing cross-section in a radial outward direction The tapered marginal area terminates in rim 6. The outermost marginal area 12 adjacent edge 6 may have a thickness approximately $\frac{1}{8}^{th}$ inch or less. The concavo-convex shape of the shield permits reduced thickness of the shield while maintaining adequate rigidity. Further, the reduced thickness of shield area 12 permits radial displacement of rim 6 when a user imparts force in an axial direction to the shield with rim 6 being displaced outwardly. Accordingly the present shield has a diameter when relaxed but is capable of having an increased diameter when biased toward wheel 3. Wheel diameters typically vary by one inch and accordingly rim 6 needs to flex outwardly but one-half inch to permit shield use on a second or larger diameter wheel. An irregular shield edge is at 14 with inwardly curved segments 14A–14B which contribute to positioning of adjacent segments of rim 6.

While I have shown but one embodiment of the invention, it will be apparent to those skilled in the art that the invention may be embodied still otherwise without departing from the spirit and scope of the claimed invention.

Having thus described the invention, what is desired to be secured by a Letters Patent is:

1. A wheel shield for hand-held placement over the wheel of an automobile when washing the sidewall of a tire on the wheel, said shield including, a concavo-convex generally semi-circular body having an arcuate perimeter, said body of manually flexible construction, a rim projecting from in said perimeter, and said concavo-convex generally semi-circular body defining at least one opening into which a user's hand or fingers may extend, said rim, upon abutment with the tire sidewall, providing a barrier to shield the wheel of an automobile from matter during washing of the tire sidewall; and said concavo-convex generally semi-circular body is of diminishing cross section in a radial outward direction to provide flexibility of the wheel shield to accommodate automobile wheels of different diameters.

2. The wheel shield claimed in claim 1 wherein said concavo-convex generally semicircular body, upon being biased by hand toward the tire sidewall, flexes to radially outwardly displace said rim for optimum abutment of the rim with the tire sidewall adjacent the wheel rim.

* * * * *